(12) United States Patent
Hayashi (10) Patent No.: US 11,796,502 B2
(45) Date of Patent: Oct. 24, 2023

(54) GAS SENSOR (71) Applicant: KABUSHIKI KAISHA TOSHIBA, Tokyo (JP)

(72) Inventor: Yumi Hayashi, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 67 days.

(21) Appl. No.: 17/347,445

(22) Filed: Jun. 14, 2021

(65) Prior Publication Data

US 2021/0310983 A1      Oct. 7, 2021

Related U.S. Application Data

(62) Division of application No. 15/914,701, filed on Mar. 7, 2018, now abandoned.

(30) Foreign Application Priority Data

Nov. 28, 2017    (JP) .................................. 2017-227935

(51) Int. Cl.
| | | |
|---|---|---|
| *G01N 27/407* | (2006.01) | |
| *G01N 27/22* | (2006.01) | |
| *G01N 27/416* | (2006.01) | |

(52) U.S. Cl.
CPC ....... *G01N 27/4074* (2013.01); *G01N 27/226* (2013.01); *G01N 27/416* (2013.01); *G01N 2027/222* (2013.01)

(58) Field of Classification Search
None
See application file for complete search history.

(56) References Cited

U.S. PATENT DOCUMENTS

| | | |
|---|---|---|
| 5,451,920 A | 9/1995 | Hoffheins et al. |
| 5,670,115 A | 9/1997 | Cheng et al. |
| 6,114,943 A | 9/2000 | Lauf |
| 6,265,222 B1 | 7/2001 | DiMeo, Jr. et al. |
| 6,290,840 B1 * | 9/2001 | Kato ................... G01N 27/4074 204/426 |

(Continued)

FOREIGN PATENT DOCUMENTS

| | | |
|---|---|---|
| EP | 2 169 400 A1 | 3/2010 |
| JP | H2-165034 A | 6/1990 |

(Continued)

OTHER PUBLICATIONS

Hayashi et al., "Investigation of PD-CU-SI Metallic Glass Film for Hysteresis-Free and Fast Response Capacitive MEMS Hydrogen Sensors," 19th International Conference on Solid-State Sensors, Actuators and Microsystems (Transducers 2017) (Jun. 18-22, 2017), pp. 311-314.

(Continued)

*Primary Examiner* — Brian R Gordon
(74) *Attorney, Agent, or Firm* — Finnegan, Henderson Farabow, Garrett & Dunner, LLP (57) ABSTRACT

According to one embodiment, a gas sensor includes a fixed electrode, and a film structure which covers the fixed electrode, forms a cavity inside the film structure, and includes a sensitive layer formed of an amorphous material containing a metal element, and a cap layer provided on the sensitive layer. The film structure is allowed to be deformed when the sensitive layer absorbs a predetermined gas.

18 Claims, 6 Drawing Sheets

(56) References Cited

U.S. PATENT DOCUMENTS

| | | | | |
|---|---|---|---|---|
| 6,337,009 | B1* | 1/2002 | Nadanami | G01N 33/005 204/426 |
| 6,652,723 | B1* | 11/2003 | Nadanami | G01N 27/4074 204/426 |
| 10,281,444 | B2 | 5/2019 | Ikehashi et al. | |
| 10,598,647 | B2* | 3/2020 | Ikehashi | G01N 27/227 |
| 11,493,471 | B2* | 11/2022 | Hayashi | G01N 27/221 |
| 2002/0005353 | A1* | 1/2002 | Kato | G01N 27/4075 204/426 |
| 2003/0205078 | A1* | 11/2003 | Hasei | G01N 27/4074 73/23.31 |
| 2008/0053827 | A1* | 3/2008 | Ota | G01N 33/004 29/857 |
| 2015/0377823 | A1* | 12/2015 | Akasaka | G01N 27/4074 156/60 |
| 2017/0261463 | A1* | 9/2017 | Sugiura | G01N 27/4071 |
| 2017/0263966 | A1* | 9/2017 | Lozada | H01M 8/1011 |
| 2017/0299543 | A1* | 10/2017 | Akasaka | G01N 27/407 |
| 2017/0343522 | A1 | 11/2017 | Ikehashi et al. | |
| 2018/0172623 | A1* | 6/2018 | Araki | G01N 27/4067 |
| 2019/0162694 | A1* | 5/2019 | Hayashi | G01N 27/4074 |
| 2019/0317043 | A1* | 10/2019 | Wei | G01N 33/0059 |
| 2020/0300803 | A1* | 9/2020 | Hayashi | H01L 23/53209 |

FOREIGN PATENT DOCUMENTS

| | | |
|---|---|---|
| JP | 2001-296238 A | 10/2001 |
| JP | 2008-8869 A | 1/2008 |
| JP | 2008-261634 A | 10/2008 |

OTHER PUBLICATIONS

Yamazaki et al., "A High Sensitivity MEMS Capacitive Hydrogen Sensor With Inverted T-Shaped Electrode and Ring-Shaped Palladium," 19th International Conference on Solid-State Sensors, Actuators and Microsystems (Transducers 2017) (Jun. 18-22, 2017), pp. 226-229.

* cited by examiner

GAS SENSOR

CROSS-REFERENCE TO RELATED APPLICATIONS

This application is a divisional of application Ser. No. 15/914,701, filed Mar. 7, 2018, now abandoned, which claims the benefit of priority from Japanese Patent Application No. 2017-227935, filed Nov. 28, 2017, the entire contents of which are incorporated by reference.

FIELD

Embodiments described herein relate generally to a gas sensor.

BACKGROUND

Gas sensors (hydrogen gas sensors, etc.) using micro-electromechanical systems (MEMS) have been suggested.

However, the performance of conventional gas sensors has not been sufficient.

DETAILED DESCRIPTION

In general, according to one embodiment, a gas sensor includes: a fixed electrode; and a film structure which covers the fixed electrode, forms a cavity inside the film structure, and includes: a sensitive layer formed of an amorphous material containing a metal element; and a cap layer provided on the sensitive layer. The film structure is allowed to be deformed when the sensitive layer absorbs a predetermined gas.

Embodiments will be described hereinafter with reference to the accompanying drawings.

According to one embodiment, a gas sensor is manufactured, using micro-electromechanical systems (MEMS). The gas sensor of the embodiment is mainly used as a hydrogen gas sensor.

Figure 1:
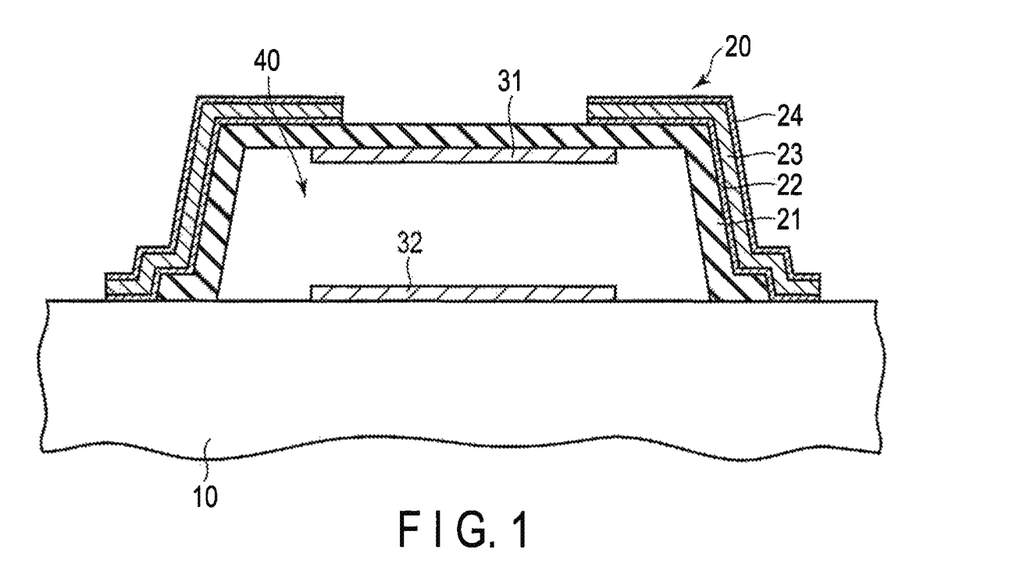
FIG. 1 is a cross-sectional view schematically showing the structure of a gas sensor according to an embodiment.
Figure 2:
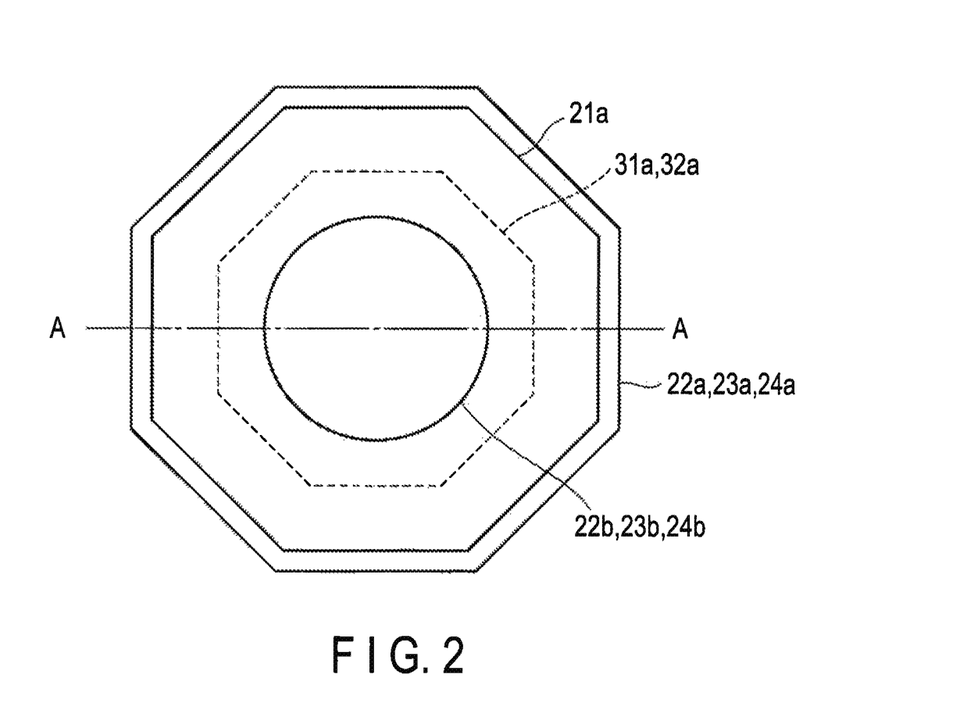
FIG. 2 is a plan view schematically showing the structure of the gas sensor according to the embodiment.

FIG. 1 is a cross-sectional view schematically showing the structure of a gas sensor according to an embodiment. FIG. 2 is a plan view schematically showing the structure of the gas sensor according to the embodiment. The cross-sectional surface along line A-A of FIG. 2 substantially corresponds to FIG. 1.

The gas sensor shown in FIG. 1 and FIG. 2 comprises a bottom structure 10, a film structure 20 provided on the bottom structure 10, a movable electrode 31 and a fixed electrode 32. A cavity 40 is formed inside the film structure 20. The cavity 40 is formed between the bottom structure 10 and the film structure 20. The fixed electrode 32 is covered with the film structure 20. The movable electrode 31 faces the fixed electrode 32. A variable capacitor is formed by the movable electrode 31 and the fixed electrode 32.

For example, a semiconductor substrate (not shown), a transistor (not shown), lines (not shown) and an interlayer insulating film (not shown) are provided in the bottom structure 10.

The film structure 20 comprises a base layer 21, an intermediate layer (adhesion layer) 22 provided on the base layer 21, a sensitive layer 23 provided on the intermediate layer 22, and a cap layer 24 provided on the sensitive layer 23.

FIG. 2 shows the positional relationships of outer edge 21a of the base layer 21, outer edge 22a and inner edge 22b of the intermediate layer 22, outer edge 23a and inner edge 23b of the sensitive layer 23, outer edge 24a and inner edge 24b of the cap layer 24, outer edge 31a of the movable electrode 31 and outer edge 32a of the fixed electrode 32.

The base layer 21 is formed of silicon nitride (SiN) or silicon oxide (SiO). The peripheral portion of the base layer 21 is fixed to the bottom structure 10. The cavity 40 is formed inside the base layer 21. A through-hole may be provided in the base layer 21 such that the pressure of the inside of the film structure 20 is equal to that of the outside of the film structure 20.

The intermediate layer (adhesion layer) 22 is provided to enhance the adhesiveness between the base layer 21 and the sensitive layer 23, and contains at least one of titanium (Ti) and tantalum (Ta). The intermediate layer 22 may further contain nitrogen (N). Specifically, the intermediate layer 22 is formed as a titanium (Ti) layer, a titanium nitride (TiN) layer, a tantalum (Ta) layer or a tantalum nitride (TaN) layer. The intermediate layer 22 may be formed by a stacked film comprising an arbitrary combination of these layers.

The sensitive layer 23 is provided to sense a predetermined gas and is formed of an amorphous material containing a metal element. The amorphous material is preferably an amorphous alloy material. The amorphous alloy material is preferably a metallic glass material. The metallic glass material refers to an amorphous alloy material having glass-transition temperature. In the present embodiment, the amorphous material is a hydrogen absorption (storage) material. The amorphous material contains an element which brings about catalysis to dissociate a hydrogen molecule into hydrogen atoms. Specifically, the amorphous material contains at least one element selected from palladium (Pd), platinum (Pt) and gold (Au), as an element which brings about catalysis. To enhance the absorption function of a desired gas, the amorphous material further contains at least one element selected from silicon (Si), phosphorus (P) and boron (B). The amorphous material may further contain at least one element selected from copper (Cu), silver (Ag), nickel (Ni), gold (Au), iron (Fe) and chromium (Cr). In the present embodiment, PdCuSi metallic glass is used for the amorphous material. The sensitive layer 23 is formed as a PdCuSi metallic glass layer. The thickness of the sensitive layer (PdCuSi metallic glass layer) 23 is approximately several hundred nanometers to several micrometers.

The cap layer 24 is provided to prevent the oxidation of the elements contained in the sensitive layer 23. The cap layer 24 preferably contains an element (first element) which brings about catalysis to dissociate a hydrogen molecule into hydrogen atoms, or the same element (second element) as a predetermined element contained in the sensitive layer 23. Specifically, the cap layer 24 contains at least one element selected from palladium (Pd), platinum (Pt) and gold (Au), as the first element. Alternatively, the cap layer 24 contains at least one element selected 15' from silicon (Si), phosphorous (P) and boron (B), as the second element. In the present embodiment, the sensitive layer 23 is formed as a PdCuSi metallic glass layer. Thus, the cap layer 24 is formed as a palladium (Pd) layer or a silicon (Si) layer. The thickness of the cap layer 24 is preferably less than one tenth of the thickness of the sensitive layer 23. When the cap layer 24 is excessively thick, hysteresis may occur in the absorption and release characteristics of hydrogen. Specifically, the thickness of the cap layer 24 is preferably in the range approximately from the thickness of one atomic layer to 10 nm.

As shown in FIG. 2, the pattern of the intermediate layer 22, the sensitive layer 23 and the cap layer 24 has a planar shape like a ring. Outer edges 22a, 23a and 24a of the pattern of the intermediate layer 22, the sensitive layer 23 and the cap layer 24 are located outside outer edge 21a of the base layer.

The movable electrode 31 is connected to the film structure 20 and is provided on the lower surface of the base layer 21. More specifically, the entire pattern of the movable electrode 31 is in contact with the lower surface of the base layer 21. The movable electrode 31 functions as the top electrode of the variable capacitor.

The fixed electrode 32 is provided on the bottom structure 10 and faces the movable electrode 31. The fixed electrode 32 functions as the bottom electrode of the variable capacitor.

When the sensitive layer 23 absorbs (stores) a predetermined gas (in the present embodiment, hydrogen gas), the sensitive layer 23 expands. As a result, distortion occurs in the sensitive layer 23. Thus, the sensitive layer 23 is deformed. For example, the central portion of the sensitive layer 23 is deformed to the lower side (in other words, the central portion becomes hollow to the lower side). As the sensitive layer 23 is deformed, the entire film structure 20 is also deformed. As the film structure 20 is deformed, the movable electrode 31 is also deformed. The distance between the movable electrode (top electrode) 31 and the fixed electrode (bottom electrode) 32 is changed. As the distance between the movable electrode 31 and the fixed electrode 32 is changed, the capacitance of the variable capacitor formed by the movable electrode 31 and the fixed electrode 32 is changed. The absorption (storage) of hydrogen of the sensitive layer 23 can be detected by detecting the change of the capacitance. In this way, the concentration of hydrogen around the sensitive layer 23 can be detected.

Figure 3:
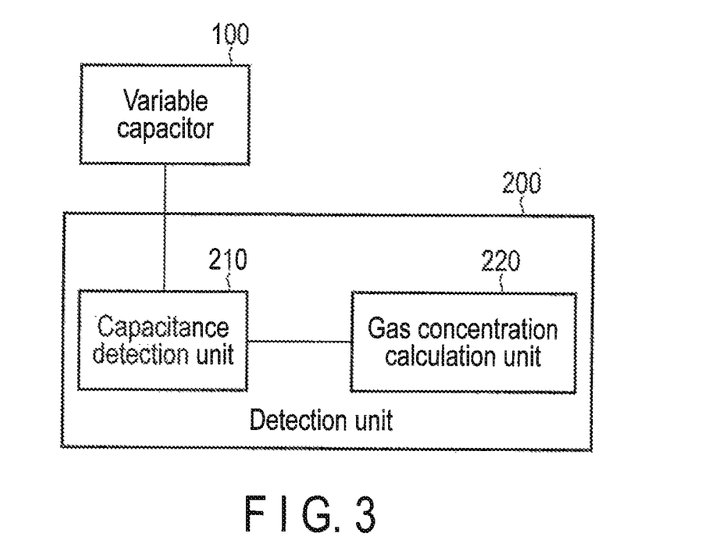
FIG. 3 is a block diagram showing the basic structure of a gas detection system using the gas sensor according to the embodiment.

FIG. 3 is a block diagram showing the basic structure of a gas detection system (hydrogen gas detection system) using the above gas sensor (hydrogen gas sensor).

In the gas detection system shown in FIG. 3, a variable capacitor 100 is formed by the movable electrode (top electrode) 31 and the fixed electrode (bottom electrode) 32, and a detection unit 200 is connected to the variable capacitor 100. The detection unit 200 may be provided either in the bottom structure 10 of FIG. 1 or outside the bottom structure 10. The detection unit 200 includes a capacitance detection unit 210 which detects the capacitance of the variable capacitor 100, and a gas concentration calculation unit 220 which calculates the concentration of gas (hydrogen gas) based on the capacitance detected by the capacitance detection unit 210. It is possible to calculate the concentration of gas (hydrogen gas) by the gas concentration calculation unit 220 by obtaining the relationship between the capacitance of the variable capacitor 100 and the concentration of gas (hydrogen gas) in advance.

As described above, in the gas sensor of the present embodiment, the cap layer 24 is provided on the sensitive layer 23. When the cap layer 24 is provided in the above manner, it is possible to prevent the oxidation of the elements contained in the sensitive layer 23. Further, the change of the internal structure of the sensitive layer 23 can be prevented. As a result, an excellent gas sensor can be obtained in terms of characteristics and reliability. Additional explanation is provided below.

To obtain an excellent gas sensor, the use the sensitive layer 23 which is excellent in gas absorption (storage) characteristics is important. However, when the internal structure of the amorphous material used for the sensitive layer 23 is changed, it is difficult to obtain desired gas absorption characteristics. For example, when oxide is formed by the reaction between predetermined elements (silicon, phosphorous, boron, etc.) contained in the amorphous material and the oxygen contained in air, the concentration of the predetermined elements contained in the amorphous material is decreased. As a result, the amorphous structure is destroyed, thereby promoting crystallization. In this way, it is difficult to obtain desired gas absorption (storage) characteristics.

For example, a case where PdCuSi is employed as the amorphous material of the sensitive layer 23 is explained. It is known that a good amorphous structure (metallic glass structure) is obtained when the ratio of semimetal elements such as Si to PdCuSi is greater than or equal to a certain level (for example, approximately 20 at %). Since PdCuSi comprises this amorphous structure (metallic glass structure), PdCuSi is excellent in hydrogen absorption and release characteristics without forming hydride at the time of absorbing (storing) hydrogen. The density of PdCuSi comprising the amorphous structure (metallic glass structure) is low. Thus, hydrogen atoms can move in PdCuSi at high speed, thereby realizing high-speed, response characteristics. However, when silicon is oxidized by the oxygen contained in air, silicon oxide is formed. The concentration of Si in PdCuSi is decreased. As a result, the amorphous structure is destroyed, thereby promoting crystallization. In this way, desired characteristics cannot be obtained. In the present embodiment, the cap layer 24 is provided on the sensitive layer 23. The cap layer 24 is capable of preventing the incursion of oxygen into the sensitive layer 23. Thus, it is possible to prevent the oxidation of silicon. The above problem can be solved.

The above problem may be caused when an element which can be easily oxidized is contained in the amorphous material while silicon is not contained in the amorphous material used for the sensitive layer 23. Even in this case, the above problem can be solved by providing the cap layer 24 on the sensitive layer 23.

When the cap layer 24 contains the same predetermined element as an element contained in the sensitive layer 23, the diffusion of the predetermined element from the sensitive layer 23 into the cap layer 24 can be prevented. Thus, the above problem can be more effectively solved. It is possible to prevent the oxidation of the predetermined element contained in the sensitive layer 23 by oxidizing the predetermined element contained in the cap layer 24. For example, in the above embodiment, when PdCuSi is employed as the amorphous material of the sensitive layer 23, and an Si layer is used for the cap layer 24, it is possible to effectively prevent the oxidation of the Si contained in the sensitive layer 23.

When the cap layer 24 contains an element which brings about catalysis to dissociate a hydrogen molecule into hydrogen atoms, a hydrogen molecule can be effectively dissociated into hydrogen atoms by catalysis. A catalytic element is contained in the sensitive layer 23 to dissociate a hydrogen molecule into hydrogen atoms. To realize a desired absorption function, the sensitive layer 23 further contains an element other than the catalytic element. Since the sensitive layer 23 contains an element other than the catalytic element, catalysis is decreased in the sensitive layer 23. When the cap layer 24 also contains a catalytic element, a hydrogen molecule can be further effectively dissociated into hydrogen atoms. For example, in the above embodiment, when PdCuSi is employed as the amorphous material of the sensitive layer 23, and a Pd layer is used for the cap layer 24, it is possible to effectively dissociate a hydrogen molecule into hydrogen atoms by the catalysis of Pd and further effectively absorb (store) hydrogen.

Figure 4:
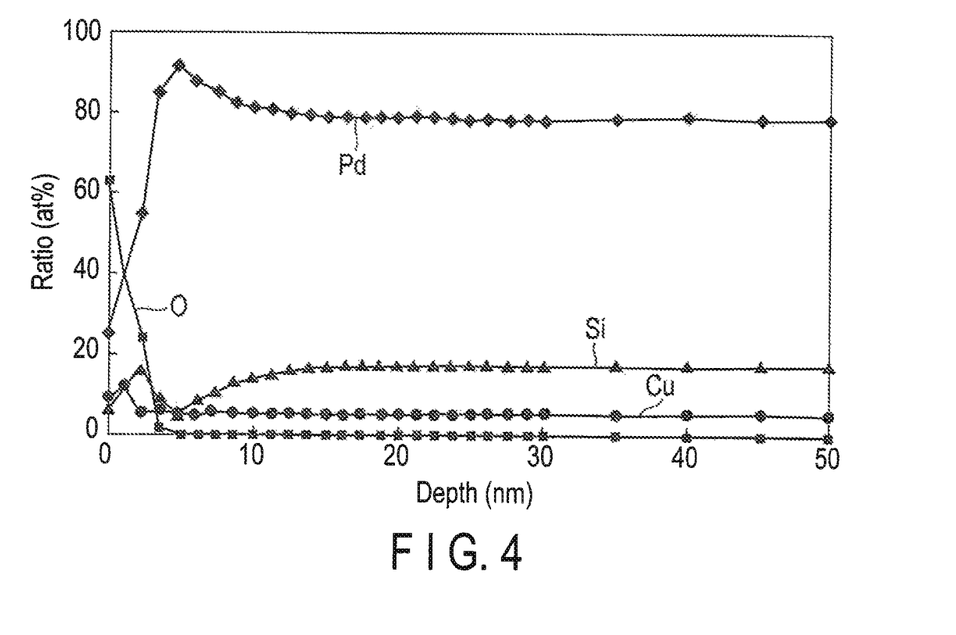
FIG. 4 shows the result of analysis of the concentration profile of the elements contained in a film structure when a cap layer is not provided.

FIG. 4 shows the result of analysis (measurement) of the concentration profile (ratio) of the elements contained in the film structure 20 when the cap layer 24 is not provided on the sensitive layer 23. For the measurement sample, PdCuSi is used. To clarify the mechanism of oxidation, the surface is forcibly oxidized. As shown in FIG. 4, a large amount of oxygen (O) is present near the surface of the film structure 20. Near the surface of the film structure 20, the ratio of silicon (Si) is high. Thus, it is clear that silicon oxide ($SiO_2$) is formed near the surface of the film structure 20. Near the portion having a depth of approximately 5 nm, the ratio of silicon (Si) is decreased, and the ratio of palladium (Pd) is high. Thus, near the portion having a depth of approximately 5 nm, Si is decreased, and the main material is PdCu. It seems that the Si contained in PdCuSi has been used to form silicon oxide ($SiO_2$) near the surface of the film structure 20.

Figure 5:
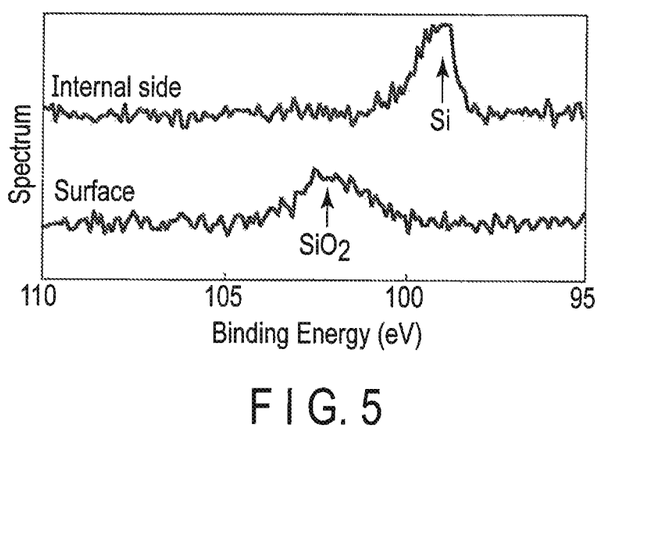
FIG. 5 shows the result of analysis of the internal side and surface of the film structure when a cap layer is not provided.

FIG. 5 shows the result of analysis (measurement) of the internal side and surface of the film structure 20 when the cap layer 24 is not provided on the sensitive layer 23. For the measurement sample, PdCuSi is used. As shown in FIG. 5, the peak of Si is observed inside the film structure 20. On the surface of the film structure 20, the peak of $SiO_2$ is observed. It is clear that silicon oxide ($SiO_2$) is formed near the surface of the film structure 20.

As described above, when the surface of the film structure is oxidized, and silicon oxide is formed, the ratio of silicon is decreased immediately under silicon oxide. Thus, PdCu is formed. In this way, the amorphous structure of PdCuSi is destroyed, thereby promoting crystallization. Since this crystallization is promoted as time passes, a gas sensor having desired characteristics cannot be obtained.

Figure 6:
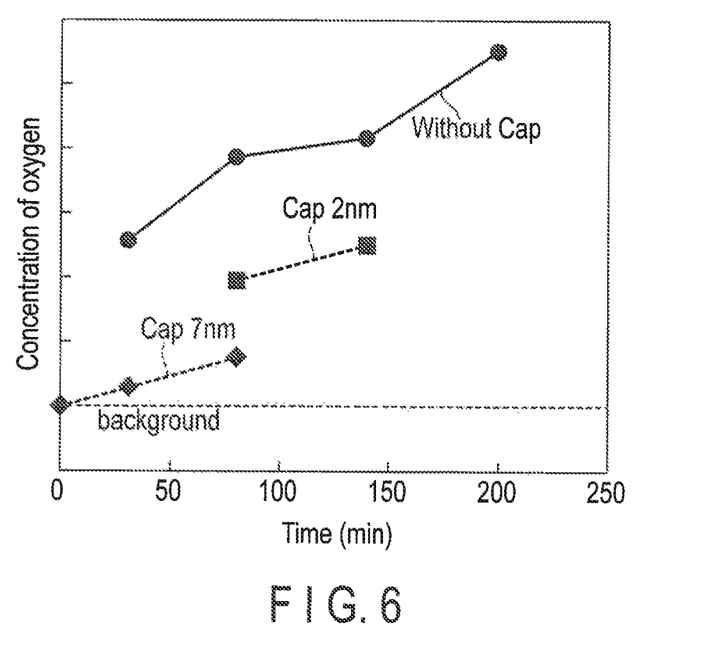
FIG. 6 shows an effect caused when a cap layer is provided on a sensitive layer according to the embodiment.

FIG. 6 shows an effect caused when a cap layer is provided on the sensitive layer. Specifically, FIG. 6 shows the result of analysis (measurement) when annealing is performed at 200° C. with a cap layer having a thickness of 7 nm, with a cap layer having a thickness of 2 nm or without a cap layer. The horizontal axis represents the annealing time. The vertical axis represents the concentration of oxygen in the surface area of the sensitive layer. The material of the sensitive layer is PdCuSi, and the material of the cap layer is Pd. For the analysis, a scanning electron microscope/energy dispersive X-ray spectroscope (SEM-EDX) is used. Since the spot size of analysis is large, the information of air is also reflected on the result of analysis. Therefore, even when oxygen is not actually contained in the sensitive layer, oxygen is detected as background.

As shown in FIG. 6, when a cap layer is provided, the concentration of oxygen is decreased in comparison with a case where a cap layer is not provided. The concentration of oxygen when the cap layer is thick (7 nm) is less than that when the cap layer is thin (2 nm). The cap layer prevents the incursion of oxygen into the sensitive layer.

Figure 7:
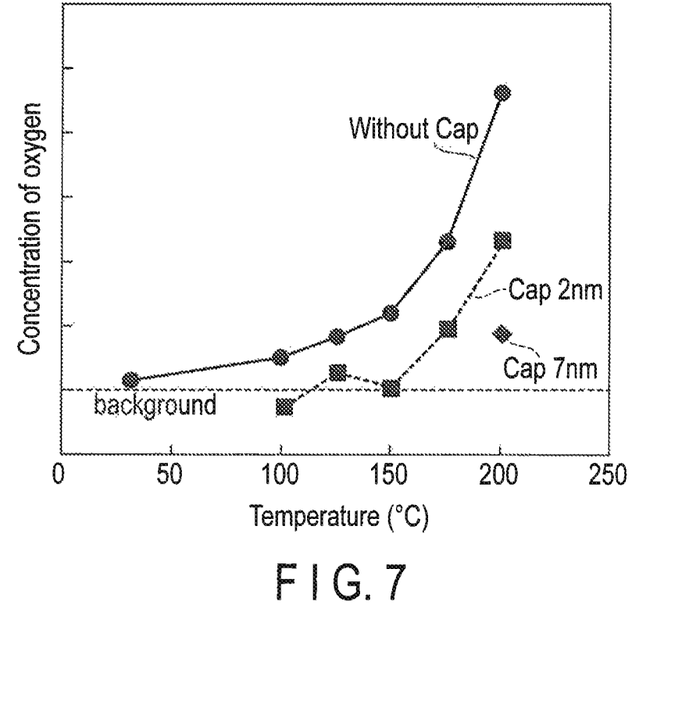
FIG. 7 shows an effect caused when a cap layer is provided on the sensitive layer according to the embodiment.

FIG. 7 also shows an effect caused when a cap layer is provided on the sensitive layer. Specifically, FIG. 7 shows the result of analysis (measurement) when annealing is performed for 80 minutes with a cap layer having a thickness of 7 nm, with a cap layer having a thickness of 2 nm or without a cap layer. The horizontal axis represents the annealing temperature. The vertical axis represents the concentration of oxygen in the surface area of the sensitive layer. The material of the sensitive layer is PdCuSi, and the material of the cap layer is Pd. For the analysis, an SEM-EDX is used.

As shown in FIG. 7, in this result of analysis, similarly, when a cap layer is provided, the concentration of oxygen is decreased in comparison with a case where a cap layer is not provided. The concentration of oxygen when the cap layer is thick (7 nm) is less than that when the cap layer is thin (2 nm). In a manner similar to that of FIG. 6, the cap layer prevents the incursion of oxygen into the sensitive layer.

The above results of analysis show that, when the cap layer 24 is provided on the sensitive layer 23, the incursion of oxygen into the sensitive layer 23 is prevented. In this way, the crystallization of the sensitive layer 23 is prevented, thereby obtaining an excellent gas sensor in terms of characteristics and reliability.

In the gas sensor of the present embodiment, the intermediate layer (adhesion layer) 22 containing at least one of titanium (Ti) and tantalum (Ta) is provided on the base layer 21. Further, the sensitive layer 23 is provided on the intermediate layer 22. By providing the intermediate layer 22 containing at least one of titanium (Ti) and tantalum (Ta), the adhesiveness between the base layer 21 and the sensitive layer 23 is improved. As a result, the excellent film structure 20 can be obtained, thereby realizing an excellent gas sensor in terms of characteristics and reliability. In particular, the above film structure 20 is deformed by absorbing a predetermined gas. Therefore, the adhesiveness between the base layer 21 and the sensitive layer 23 is important. In the present embodiment, it is possible to assuredly maintain the adhesiveness between the base layer 21 and the sensitive layer 23 by providing the intermediate layer 22 even when the film structure 20 is deformed.

Now, this specification explains some modification examples of the present embodiment.

Figure 8:
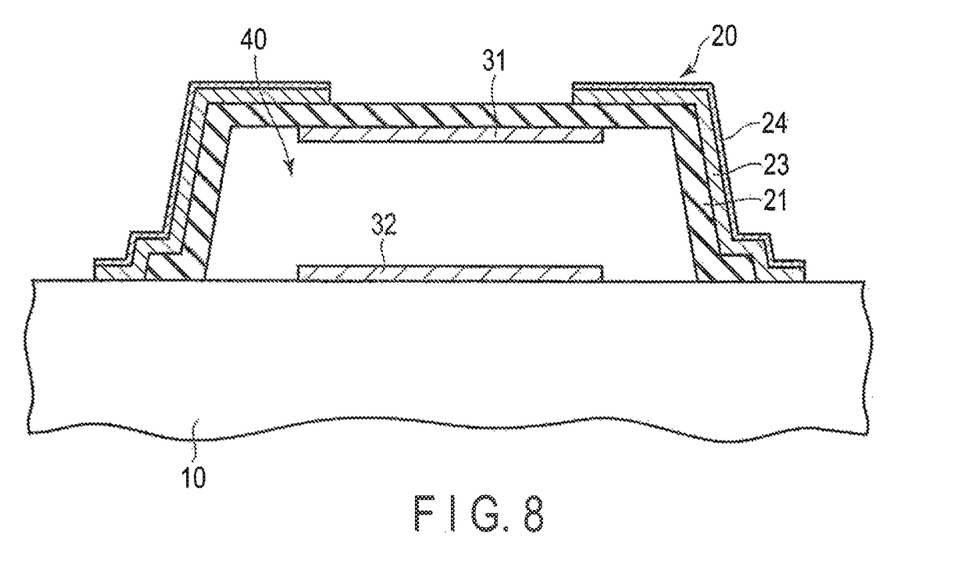
FIG. 8 is a cross-sectional view schematically showing the structure of the first modification example of the gas sensor according to the embodiment.

FIG. 8 is a cross-sectional view schematically showing the structure of the first modification example of the gas sensor according to the embodiment. In the above embodiment, the intermediate layer 22 is provided between the base layer 21 and the sensitive layer 23. In this modification example, the intermediate layer 22 is not provided. Thus, the film structure 20 may be structured by the base layer 21, the sensitive layer 23 and the cap layer 24.

Figure 9:
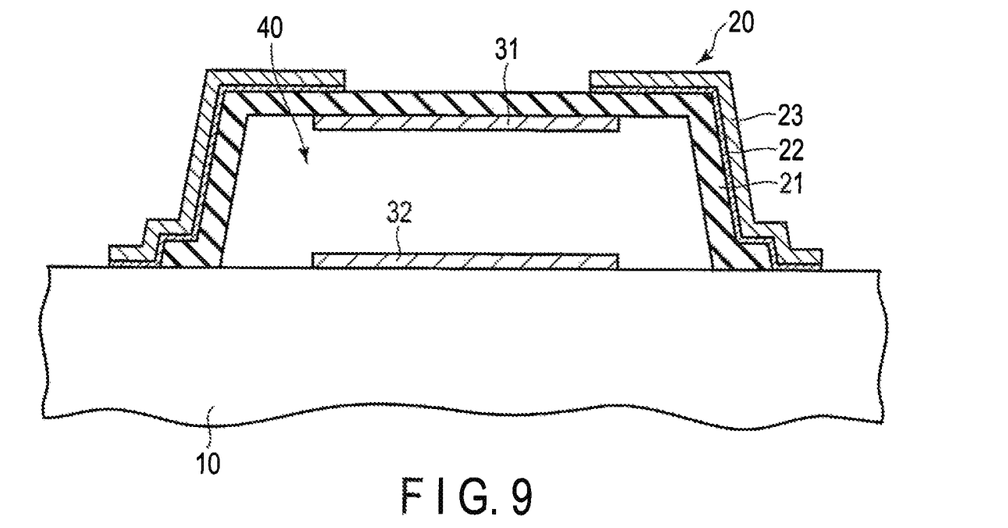
FIG. 9 is a cross-sectional view schematically showing the structure of the second modification example of the gas sensor according to the embodiment.

FIG. 9 is a cross-sectional view schematically showing the structure of the second modification example of the gas sensor according to the embodiment. In the above embodiment, the cap layer 24 is provided on the sensitive layer 23. In this modification example, the cap layer 24 is not provided. Thus, the film structure 20 may be structured by the base layer 21, the intermediate layer 22 and the sensitive layer 23.

Figure 10:
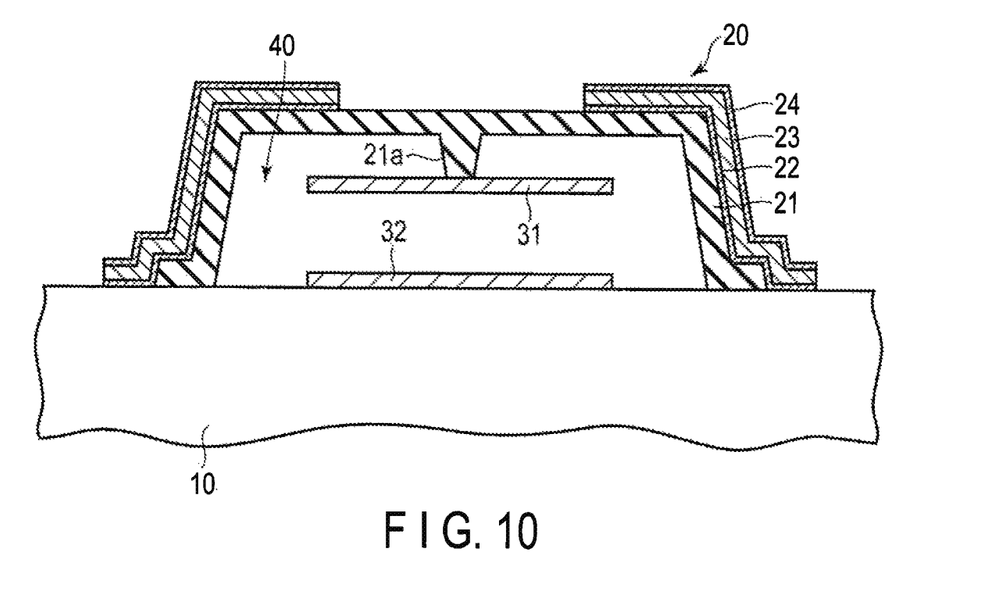
FIG. 10 is a cross-sectional view schematically showing the structure of the third modification example of the gas sensor according to the embodiment.

FIG. 10 is a cross-sectional view schematically showing the structure of the third modification example of the gas sensor according to the embodiment. In the above embodiment, the entire pattern of the movable electrode 31 is provided on the lower surface of the film structure 20. In this modification example, a protrusion 21a is provided in the base layer 21, and the movable electrode 31 is connected to the distal end of the protrusion 21a. When the sensitive layer 23 absorbs (stores) gas (hydrogen gas), and the film structure 20 is deformed, the position of the movable electrode 31 connected to the film structure 20 is perpendicularly changed. As a result, the distance between the movable electrode (top electrode) 31 and the fixed electrode (bottom electrode) 32 is changed. Thus, a variable capacitor can be formed. On the same principle of the above embodiment, an excellent gas sensor (hydrogen sensor) can be realized. In this modification example, as explained in the first and second modification examples, one of the intermediate layer 22 and the cap layer 24 can be omitted.

Figure 11:
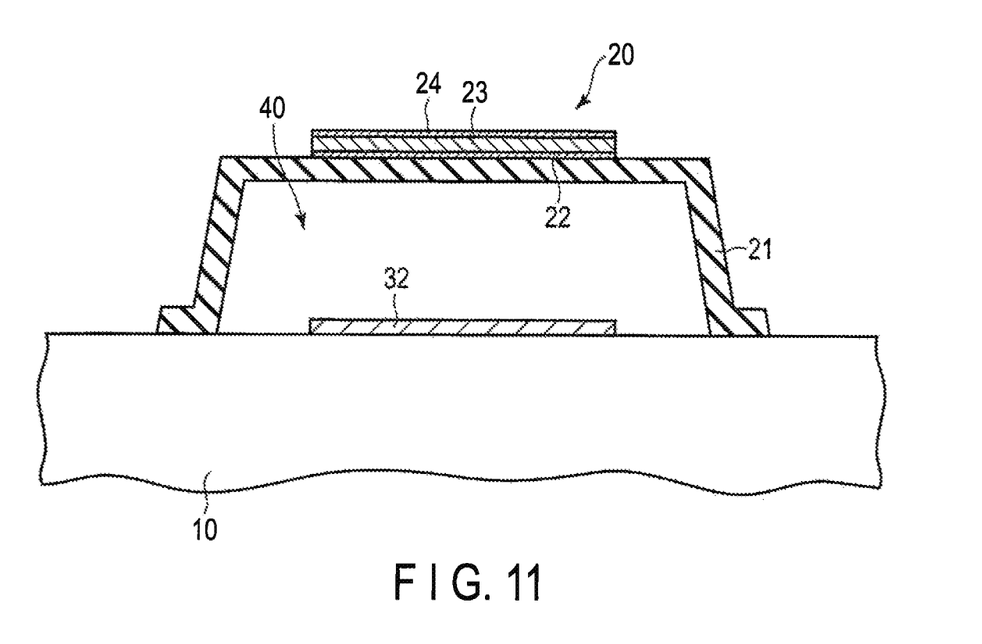
FIG. 11 is a cross-sectional view schematically showing the structure of the fourth modification example of the gas sensor according to the embodiment.

FIG. 11 is a cross-sectional view schematically showing the structure of the fourth modification example of the gas sensor according to the embodiment. In the above embodiment, the sensitive layer 23 and the movable electrode 31 are separately provided. In this modification example, the sensitive layer 23 also functions as a movable electrode. The sensitive layer 23 is also used as a movable electrode. Thus, the intermediate layer 22, the sensitive layer 23 and the cap layer 24 are provided on the upper surface of the base layer 21. Even with this structure, the distance between the movable electrode (sensitive layer 23) and the fixed electrode 32 is changed in accordance with the deformation of the sensitive layer 23. Thus, a variable capacitor can be formed. On the same principle of the above embodiment, an excellent gas sensor (hydrogen sensor) can be realized. In this modification example, as explained in the first and second modification examples, one of the intermediate layer 22 and the cap layer 24 can be omitted.

In the above embodiment, this specification explains a capacitance-detection gas sensor which detects the concentration of gas based on the change of capacitance between a movable electrode (top electrode) and a fixed electrode (bottom electrode). However, the structure of the above embodiment can be also applied to a resistance-detection gas sensor. In a resistance-detection gas sensor, the resistance of a sensitive layer is changed when the sensitive layer absorbs (stores) gas. The structure of the above embodiment can be applied to this resistance-detection gas sensor. When the structure of the above embodiment is applied to a resistance-detection gas sensor, the resistance of a sensitive layer itself is detected. Thus, there is no need to provide a movable electrode or a fixed electrode.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A gas sensor comprising:
a first electrode; and
a first structure that is spaced apart from the first electrode, covers the first electrode and comprises a base layer, a sensitive layer and a cap layer, the sensitive layer being disposed between the base layer and the cap layer, the cap layer being disposed on the sensitive layer, the sensitive layer being configured to absorb a first gas, and the first structure being capable of deforming when the sensitive layer absorbs the first gas; and
a second structure on which the first electrode is provided, the second structure being connected to the first structure;
the sensitive layer including an amorphous material that includes at least one metal element and at least one non-metal element, and
the cap layer including the at least one metal element.

2. The gas sensor of claim 1, wherein
the cap layer does not include the at least one non-metal element.

3. The gas sensor of claim 1, wherein
the first structure further includes an intermediate layer provided between the sensitive layer and the base layer.

4. The gas sensor of claim 1, further comprising a second electrode provided on the first structure and facing the first electrode, the second electrode being movable with respect to the first electrode,
a shape or a position of the second electrode being changeable in accordance with deformation of the first structure.

5. The gas sensor of claim 1, wherein
the sensitive layer functions as a second electrode that is movable with respect to the first electrode.

6. The gas sensor of claim 1, wherein
the at least one metal element includes an element that brings about catalysis to dissociate a hydrogen molecule into hydrogen atoms.

7. The gas sensor of claim 1, wherein
the amorphous material is a metallic glass material.

8. The gas sensor of claim 1, wherein
the at least one metal element includes at least one element selected from palladium (Pd), platinum (Pt) and gold (Au), and the at least one non-metal element includes at least one element selected from silicon (Si), phosphorous (P) and boron (B).

9. The gas sensor of claim 8, wherein
the at least one metal element further includes at least one element selected from copper (Cu), silver (Ag), nickel (Ni), iron (Fe) and chromium (Cr).

10. The gas sensor of claim 1, wherein the first gas includes hydrogen.

11. The gas sensor of claim 3, wherein the base layer is disposed between the first electrode and the intermediate layer, and covers the first electrode.

12. The gas sensor of claim 1, wherein
the base layer includes silicon nitride or silicon oxide.

13. The gas sensor of claim 3, wherein
the intermediate layer includes at least one of titanium (Ti) and tantalum (Ta).

14. The gas sensor of claim 3, wherein
the intermediate layer further contains nitrogen (N).

15. The gas sensor of claim 14, wherein
the intermediate layer comprises a titanium layer, a titanium nitride layer, a tantalum layer, or a tantalum nitride layer.

16. The gas sensor of claim 1, wherein
the cap layer is thinner than the sensitive layer.

17. The gas sensor of claim 1, wherein
the sensitive layer is configured to deform when the sensitive layer absorbs the first gas.

18. A system, comprising:
the gas sensor of claim 1;
a capacitance detection unit configured to detect a capacitance between the first electrode and the second electrode; and
a gas concentration calculation unit configured to calculate a concentration of the first gas based on the capacitance detected by the capacitance detection unit.

* * * * *